March 25, 1924.
M. SPUHR
ROTARY DISK VALVE
Filed Jan. 28, 1921
1,487,762
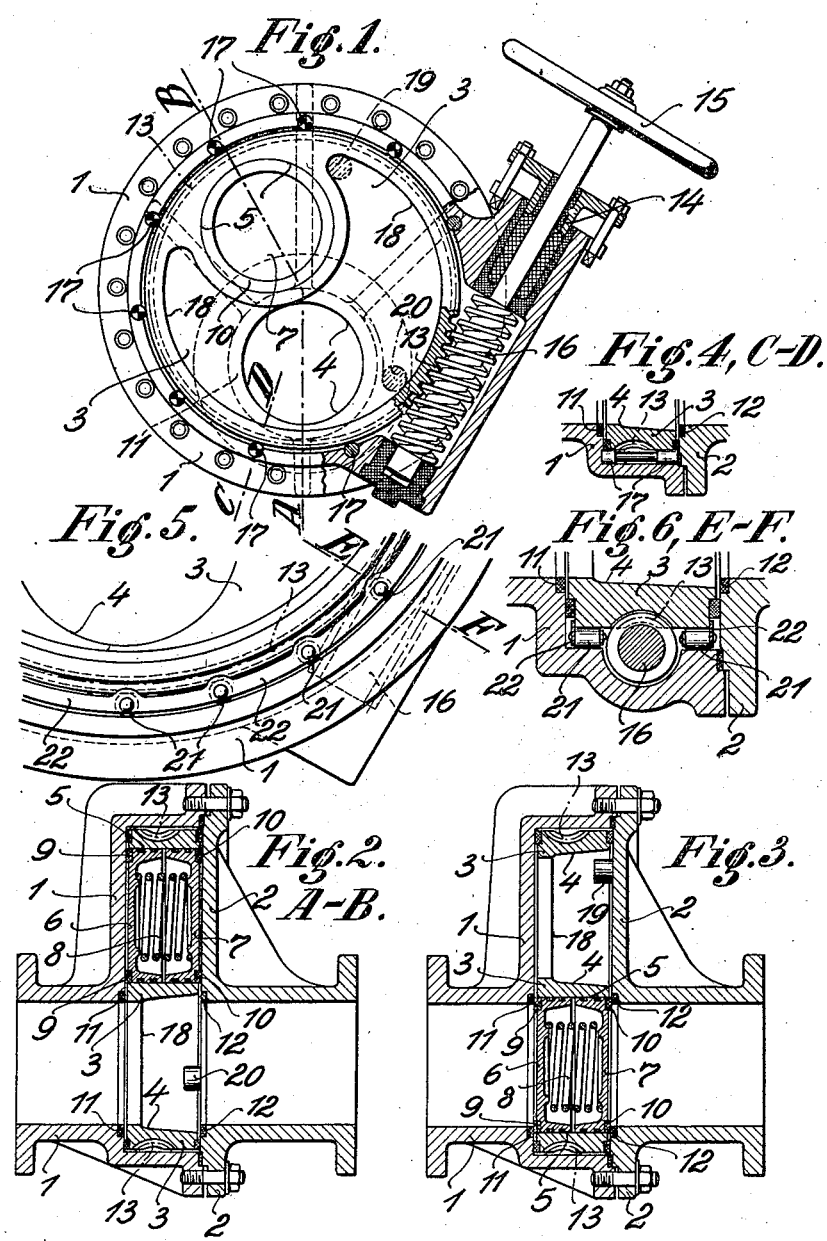
Inventor
Max Spuhr.

Patented Mar. 25, 1924.

1,487,762

UNITED STATES PATENT OFFICE.

MAX SPUHR, OF WERDEN-RUHR, GERMANY.

ROTARY DISK VALVE.

Application filed January 28, 1921. Serial No. 440,823.

(GRANTED UNDER THE PROVISIONS OF THE ACT OF MARCH 3, 1921, 41 STAT. L., 1313.)

*To all whom it may concern:*

Be it known that I, MAX SPUHR, a citizen of the German Republic, and residing at Werden-Ruhr, Germany, have invented certain new and useful improvements in a Rotary Disk Valve (for which I have filed applications in Switzerland Feb. 25, 1918, Patent No. 78,704, and July 29, 1919, Patent No. 85,334, and in Germany Sept. 5, 1918, Patent No. 345,092, and Sept. 3, 1920, Patent No. 348,725), of which the following is a specification.

The present invention relates to a rotary valve for high pressure and superheated steam, which valve may be employed for the steam to pass through it in either direction and up to the maximum openings.

Heretofore it was only possible to employ the rotary valves disclosed up to a certain limit of the passage area, as it was impossible to keep the joints tight in larger valves, in consequence of differences in temperature between the valve disk and the valve casing and the resulting warping of these parts. Above all the pressure on the lid or the surface of the casing, respectively, will, with increasing diameter of the passage increase to such an extent that the power required for turning the valve disk will rise to an enormous figure and could only be produced by hydraulic means and high gearing. These difficulties, hitherto, rendered the construction of large rotary valves impossible.

The new rotary valve according to the present invention completely obviates these difficulties, as even with the largest dimensions, an easy operation of the disk and an absolute tightness of the joints is secured. This is obtained by a suitable number of rollers being disposed between the flange of the disk and the casing, said rollers ensuring an easy operation of the disk, even under very high pressures, and also taking up the lateral pressure exerted by the worm gear driving shaft. A tight jointing of the enclosed valve is secured by spring operated pistons disposed in suitable openings in the valve disk being pressed by the pressure of the steam against the packing surfaces of the steam outlet.

In the accompanying drawings a constructional form of the rotary valve according to the present invention is shown in Fig. 1 in elevation and partly in cross section with the lid removed.

Figs. 2 and 3 are longitudinal sections on the line A—B in Fig. 1 with the passage open and closed.

Fig. 4 is a part of a longitudinal section on the line C—D in Fig 1, and

Figs. 5 and 6 are a second constructional form of the roller arrangement partly in longitudinal and cross section, respectively.

The disk 3, fitted between the casing 1 and the lid 2 has two openings 4 and 5, of which the one, 4 corresponds exactly to the passage area and, when in the position according to Figs. 1 and 2, allows of a free, rectilinear passage of the steam. In the other opening 5, which is at an angle of 150° to the opening 4, and the diameter of which is somewhat larger than the clear passage, are fitted the two pistons 6 and 7, provided with packing rings. A powerful coiled spring fitted between the two said pistons tends to press, into the closed position, the pistons with their packing surfaces 9 and 10, made of antifriction metal, against the packing rings 11 and 12 of the walls of the casing and the lid, respectively. The flange of the valve disk 3 is provided with worm wheel teeth 13, in which meshes a worm shaft 16, journalled at the side in the casing 1 and fitted with a stuffing gland 14 and a handwheel 15. By means of the latter this rotary valve can be turned. The flange is not guided directly in the casing 1, but between the disk 3, the diameter of which is somewhat smaller than the cavity in the casing, and the wall of the casing are disposed rollers 17, embedded in the latter but projecting somewhat therefrom, disposed at even pitch, whereby the flange of the disk 3 is glidingly guided at both sides of the teeth 13, and along the whole periphery. These rollers will also take up the lateral pressure caused by the operation of the worm shaft 16. The stops 19 and 20, provided on the lid 2 and engaging in the recess 18 on the lid, limit the turn of the valve disk 3 in both terminal positions in such a manner that at the terminal positions the packing surfaces 9 and 10 of the pistons 6 and 7 fit close on the packing surfaces 11 and 12 of the casing and the lid walls, respectively. The steam pressure acting, when the valve is closed, from the one or the other side against the valve, will move the nearmost piston, under tensioning of spring 8, against the neighboring second piston closing the steam outlet and thereby effecting an absolutely tight closure of the latter.

According to the modification shown in Figs. 5 and 6 a traveller ring is employed in place of the rollers 17 in the casing 1, or, on both sides of the teeth 13 several such traveller rings 22 are provided carrying corresponding short rollers 21, which serve to guide and support the flange along its whole periphery and also at both sides of the worm shaft 16 and thereby relieve the pressure on said flange.

I claim:

1. In a rotary disk valve construction of the character set forth, in combination with a casing preventing a cavity, a valve disk rotatably operable in said casing, and said casing and said valve disk presenting registerable passageways, an opening clear through said valve disk presenting a housing, pressure responsive means disposed in said housing, and means within said pressure responsive means urging the latter outwardly toward the respectively opposing casing faces.

2. In a rotary disk valve construction of the character set forth, in combination with a casing presenting a cavity, a valve disk rotatably operable in said casing, and said casing and valve disk presenting passageways adapted to register in the open valve position, means for positively actuating said valve disk within said casing cavity, packing means between said casing and said valve disk, an opening clear through said valve disk presenting a housing, pressure responsive means in said housing, comprising two axially alined piston members, and means interposed between said piston means urging them outwardly away from each other into close contact with the respectively facing casing walls.

3. In a rotary disk valve construction of the character set forth, in combination with a casing presenting a cavity, a valve disk rotatably operable in said casing, and said casing and valve disk presenting passageways adapted to register in the open valve position, and antifriction means interposed circumferentially between said casing and said valve disk.

4. In a rotary disk valve construction of the character set forth, in combination with a casing presenting a cavity, a valve disk reciprocably operable in said casing, and said casing and valve disk presenting passageways adapted to register in the open valve position, and roller bearing means circumferentially interposed between said casing and said valve disk.

5. In a rotary disk valve construction of the character set forth, in combination with a casing presenting a cavity, a valve disk in said casing, and said casing and valve disk presenting passageways adapted for registry in the open valve position, floating bearing annuli interposed between said casing and said valve disk, rollers journaled in said bearing annuli and circumferentially supporting said valve disk within said cavity, means for positively rotatably reciprocating said valve disk to a fixed extent, an opening clear through said valve disk presenting a housing of substantially the conformation of said casing passageway and adapted to register with the latter in the closed valve position, pressure responsive means in said valve disk housing, comprising two axially alined piston members and means urging these piston members outwardly away from one another into fluid-tight contact with the respectively facing casing walls, and packing means between said valve disk and said casing, and between said pressure responsive means and said valve disk and said casing respectively.

In testimony whereof I affix my signature.

MAX SPUHR.